United States Patent [19]

Kaminsky et al.

[11] Patent Number: 4,542,199
[45] Date of Patent: Sep. 17, 1985

[54] PROCESS FOR THE PREPARATION OF POLYOLEFINS

[75] Inventors: Walter Kaminsky, Pinneberg; Heinrich Hähnsen, Delingsdorf; Klaus Külper, Hamburg; Rüdiger Woldt, Lüneburg, all of Fed. Rep. of Germany

[73] Assignee: Hoechst Aktiengesellschaft, Fed. Rep. of Germany

[21] Appl. No.: 559,838

[22] Filed: Dec. 8, 1983

Related U.S. Application Data

[63] Continuation of Ser. No. 396,038, Jul. 7, 1982, abandoned.

[30] Foreign Application Priority Data

Jul. 9, 1981 [DE] Fed. Rep. of Germany ....... 3127133

[51] Int. Cl.$^4$ .......................... C08F 4/64; C08F 10/00
[52] U.S. Cl. .................................. 526/160; 502/117; 502/103; 526/165; 526/348.5; 526/348.6; 526/351; 526/352
[58] Field of Search ................................ 526/160, 165

[56] References Cited

U.S. PATENT DOCUMENTS 3,242,099  3/1966  Manyik et al. ...................... 526/165
4,404,344  9/1983  Sinn et al. ........................... 526/160

FOREIGN PATENT DOCUMENTS 220436    2/1959  Australia ............................ 526/138
2608933   9/1977  Fed. Rep. of Germany ...... 526/160

OTHER PUBLICATIONS

Long et al., Liebigs Ann. Chem. 1975, pp. 463-469.

Andresen et al., Angew. Chem. Int. Ed. Engl., vol. 15 (1976) No. 10, pp. 630-632.

Primary Examiner—Edward J. Smith
Attorney, Agent, or Firm—Connolly and Hutz

[57] ABSTRACT

The invention relates to a process for the preparation of polyolefins by polymerizing olefins of the formula $CH_2CHR$ in which $R = H$ or $C_1-C_{10}$ alkyl, on their own or as a mixture, if appropriate together with $C_4-C_{12}$ α,ω-diolefins, in solvents, liquid monomers or the gas phase, at temperatures between $-50°$ and $200°$ C., using a catalyst system composed of a soluble, halogen-containing transition metal compound of the general formula

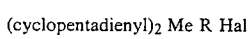
(cyclopentadienyl)$_2$ Me R Hal in which R is cyclopentadienyl or a $C_1-C_6$ alkyl radical or a halogen, in particular chlorine, Me is a transition metal, in particular zirconium, and Hal is a halogen, in particular chlorine, and a compound, containing aluminum, of the aluminoxane type having the general formulae

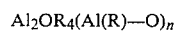
$Al_2OR_4(Al(R)-O)_n$ for a linear aluminoxane and/or

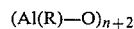
$(Al(R)-O)_{n+2}$ for a cyclic aluminoxane, in which n is a number from 4 to 20 and R is a methyl or ethyl radical, preferably a methyl radical.

8 Claims, No Drawings

PROCESS FOR THE PREPARATION OF POLYOLEFINS

This application is a continuation of Ser. No. 396,038, filed July 7, 1982, now abandoned.

The present invention relates, in general, to a process for the polymerization of ethylene and/or other olefins using new Ziegler catalyst systems. This is, in particular, a process for the preparation of polyethylene and copolymers of ethylene with other α-olefins, such as propylene, butene and hexene, at temperatures between −50° and 200° C. using a soluble, halogen-containing Ziegler system comprising a halogen-containing transition metal compound and an oxygen-containing aluminum alkyl compound.

It has been known since 1955 that combinations of transition metal compounds with metal alkyls of the main groups, the so-called Ziegler catalysts, are capable of polymerizing ethylene even at a low pressure. Furthermore, polymerization processes of this type in which halogen-free Ziegler catalysts composed of a bis-(cyclopentadienyl)-titanium dialkyl or a bis-(cyclopentadienyl)-zirconium dialkyl and aluminoxanes are employed, are known from German Offenlegungsschriften Nos. 2,608,863 and 2,608,933. It has already been possible to obtain a fairly high polymerization activity using these catalysts, but the preparation of the halogen-free transition metal compounds is expensive, and these catalysts exhibit a low polymerization activity especially at fairly low polymerization temperatures.

Olefin polymerization catalysts are also known (U.S. Pat. No. 3,242,099), which can be composed, for example of bis-(cyclopentadienyl)-titanium dichloride and an oligomeric aluminum compound of the formula

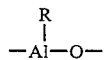

(in which R=an alkyl or aryl radical), the aluminum compound being prepared by adding water to an aluminum hydrocarbon compound, for example an aluminum trialkyl.

Finally, catalysts are also known (German Auslegeshcrift No. 1,056,616) which are composed of cyclopentadienyl compounds of titanium, zirconium or vanadium and of aluminum alkyls or aluminum alkyl halides.

All these catalyst systems of the state of the art have the disadvantage that their polymerization activity is low.

A process which uses a catalyst which starts from readily accessible (commercial) transition metal components and, in addition, also has a second advantage of exhibiting higher polymerization activities than corresponding halogen-free systems at the customary polymerization temperatures of between 40° and 80° C., is suggested in the present invention. The extremely high polymerization activity also makes it possible to incorporate higher α-olefins into the polyethylene matrix. These olefins can only be polymerized with difficulty using other soluble systems. In comparison with other halogen-containing systems in which high concentrations of titanium, aluminum and/or magnesium chlorides are used, the suggested catalyst only contains a little halogen on the transition metal compound, which is employed at concentrations of down to $10^{-10}$ mole/l. As a result of this, corrosion in the polymerization equipment is greatly reduced. In addition, the polyolefins produced have a lower halogen content than those produced by the processes employing Ziegler catalysts which have been operated hitherto. The solubility of the components and of the mixed catalyst which is formed enables metering and processing stages to be very simple.

The polymerization of olefins of the formula $CH_2CHR$ in which $R=H$ or $C_1-C_{20}$ alkyl, on their own or as a mixture, if appropriate, with $C_4-C_{12}$ α,ω-diolefins is carried out in the suggested process with a catalyst composed of the following components:

1. a compound, containing a transition metal, of the general formula

in which R is cyclopentadienyl or a $C_1-C_6$ alkyl radical or a halogen, in particular chlorine, Me is a transition metal, for example titanium and particularly zirconium and Hal is a halogen, in particular chlorine, and 2. a compound, containing aluminum, of the aluminoxane type having the general formulae

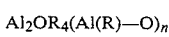

for a linear aluminoxane and

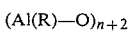

for a cyclic aluminoxane, in which n is an integer from 4 to 20 and R is a methyl or ethyl radical, preferably a methyl radical.

It is preferable to operate in such a way that the polymerization is carried out in the presence of a catalyst system comprising bis-(cyclopentadienyl)-zirconium dichloride or bis-(cyclopentadienyl)-zirconium monomethyl monochloride and methylaluminoxane.

It is advantageous if aluminoxane concentrations of $10^{-8}$ to $10^{-1}$ mole/l are used for polymerization in solvents, and also if the transition metal and the aluminum are used in an atomic ratio of 10:1 to $10^8$:1. The polymerization temperature is preferably between 20° and 120° C.

In order to regulate in a controlled manner the density of the polyethylene to be produced, it is advantageous to carry out the polymerization of ethylene in the presence of small quantities of up to 10% by weight of fairly long chain α-olefins or mixtures (for example 1-butene propene or 1-hexene). Polyethylenes having properties such as hitherto have been obtained by energy-intensive high-pressure processes can be produced in this way.

The suggested catalyst system also makes it possible to produce copolymers of ethylene and propene of any desired composition, the propene units being incorporated statistically in an atactic form.

Surprisingly, the catalyst system is suitable for polymerization in solvents, in the liquid monomers or in the gas phase. The average molecular weight of the polymers formed can be controlled by the addition of hydrogen and/or by varying the temperature. Higher molecular weights are obtained at lower temperatures, while lower molecular weights are obtained at higher temperatures.

A further advantage is, moreover, the ready accessibility of the catalyst components. Bis-(cyclopentadienyl)-zirconium dichloride is commercially available. The corresponding monoalkyl monochloride compounds can also be prepared from this in single-stage reactions.

In comparison with polymerizations carried out using halogen-free catalyst systems, markedly higher activity figures are achieved using the suggested halogen-containing catalysts. The increase in activity is at least approximately 30%, if a change is made from the halogen-free heavy metal component bis-(cyclopentadienyl)-zirconium dimethyl to the corresponding dihalide.

It is also surprising that, if a bis-(cyclopentadienyl)-zirconium dihalide or bis-(cyclopentadienyl)-zirconium monoalkyl monohalide were used, a significantly better activity was found than if the analogous titanium compounds were used. At the polymerization temperature of 70° C., which is important in practice, at which the bis-(cyclopentadienyl)-titanium compounds already decompose and thus cannot be employed, activity figures are achieved using the zirconium compounds in the process according to the invention which are higher by a factor of 10 or more than those obtained using the corresponding titanium compounds as the catalyst component at a temperature of 20° C. However, even at the same or a comparably low polymerization temperature, the activity of the zirconium catalysts of the invention is higher than that of catalysts containing corresponding titanium compounds as the heavy metal component. This improvement in the activity is all the more surprising since it was known, according to the state of the art (from German Auslegeschrift No. 1,065,616), that catalyst systems such as $ZrCl_4/AlEt_2Cl$ or bis-(cyclopentadienyl)-zirconium dichloride/$Al(CH_3)_3$ have a polymerization activity which is several orders of magnitude less than that of corresponding systems in which the zirconium compound has been replaced by the analogous titanium compound.

As well as the choice of the transition metal component, the use of specific aluminoxanes as the co-catalyst is also of importance for the high activity achieved in the process according to the invention. It is advantageous to employ oligomeric aluminoxanes containing fairly long chains. Aluminoxanes, together with the transition metal components, do not produce a highly active catalyst system if they are obtained by adding water to, for example, aluminum trimethyl—as indicated in U.S. Pat. No. 3,242,099.

Methylaluminoxane, which is particularly active, can be prepared by careful hydrolysis of aluminum trimethyl in toluene by means of the water of hydration of copper sulfate pentahydrate. Linear and cyclic aluminoxanes, containing fairly long chains and which are particularly active are formed by allowing the solutions to stand.

It is precisely and only the methylaluminoxanes of a high degree of condensation of 6 or more which have been prepared in this way which produce, in combination with the bis-(cyclopentadienyl)-zirconium compounds, the high polymerization activity, even at transition metal concentrations of less than $10^{-6}$ mole/l; together with the analogous transition metal compounds, for example the corresponding titanium compounds, they also result in an abrupt increase in the activity.

In addition, the catalyst system is also capable, because of the stability of the components, of polymerizing ethylene which is not quite pure, so that expensive purification steps for the removal of extraneous constituents from the ethylene can be dispensed with.

The invention is illustrated below in greater detail by means of examples:

EXAMPLE 1

Preparation of methylaluminoxane 37.5 g of $CuSO_4.5H_2O$ (0.15 mole, corresponding to 0.75 mole of $H_2O$) were suspended in 250 ml of toluene, 50 ml of trimethylaluminum (0.52 mole) were added and the mixture was allowed to react at 20° C. After a reaction time of 24 hours, approximately 0.9 mole of methane had been evolved. The solution was then freed from solid copper sulfate by filtration. Removal of the toluene gave 14.5 g of methylaluminoxane (50% of theory). The molecular weight, determined cryoscopically in benzene, was 850 and the average degree of oligomerization was 14.7.

Catalyst preparation and polymerization 330 ml of toluene were initially taken in a 1 liter glass autoclave which had been heated up and flushed with argon, and the system was thermostatically controlled at +90° C. 300 mg (5.0 mmoles of aluminum units) of methylaluminoxane were then added. After stirring for a short time (1 minute), 0.1 ml of a solution in toluene of $(C_5H_5)_2ZrCl_2$ ($3.33 \times 10^{-8}$ mole) was added and, after a further minute, ethylene was injected up to a pressure of 8 bar. The clear reaction solution became increasingly viscous, because of the polyethylene formed, so that the batch was discontinued after 20 minutes by adding n-butanol. As well as the immediate destruction of the catalyst, the effect of the addition of n-butanol was also to precipitate the polyethylene which had been formed. The polymer was then filtered off, washed several times with methanol and dried. The yield was 13.6 g. The average molecular weight was determined by viscometry to be 91,000. An activity of $1.7 \times 10^6$ g of PE/g of Zr.hour.bar can be calculated from this. This is 30% higher than in the comparable halogen-free system where the figure is $1.2 \times 10^6$ g of PE/g of Zr.hour.bar.

EXAMPLE 2

The procedure followed was analogous to that of Example 1, but, as a modification, $3.4 \times 10^{-7}$ ml of $(C_5H_5)_2TiCl_2$ and 295 mg (4.1 mmoles) of aluminoxane were employed and polymerization was carried out at 20° C. The yield after 0.5 hour was 5.7 g having an average molecular weight of over 1,000,000. This corresponds to an activity of 90,000 g of PE/g of Ti.hour.bar.

EXAMPLE 3

The procedure followed was analogous to that of Example 1. As a modification, $3.33 \times 10^{-8}$ mole of $(C_5H_5)_2Zr(CH_3)Cl$ and 5.2 moles of aluminoxane were employed. After a polymerization time of 10 minutes at 70° C., the polymerization activity found was $0.8 \times 10^6$ g of PE/g of Zr.hour.bar.

EXAMPLE 4

The procedure followed was analogous to that of Example 1, but the aluminoxane was dissolved in only 100 ml of toluene. After stirring for a short time (3 minutes), a solution in toluene of $(C_5H_5)_2ZrCl_2$ ($1.66 \times 10^{-6}$ mole) was added and, after a further 3 minutes, propene was injected until the total volume of liquid in the autoclave was 330 ml. The polymerization of propene was then continued with stirring for a further 44 hours at 20° C., the reaction solution becoming increasingly viscous. The excess propene was then blown off, the catalyst was destroyed by adding a little methanol and approximately 400 ml of petroleum ether were added to the viscous phase remaining. The mixture was then centrifuged. The solvent was removed and the atactic polypropylene remaining was subsequently dried. The yield was 105 g. The average molecular weight was determined by viscometry to be 5,000.

EXAMPLE 5

The procedure followed was analogous to that of Example 1, but with the modification that ethylene was copolymerized with 1-butene at 60° C. This was effected by adding 5.6 g of 1-butene additionally through a pressure burette and shortly afterwards injecting ethylene up to a pressure of 8.5 bar. A white copolymer was precipitated after 2 minutes. The yield was 6.5 g. The density of the copolymer was only 0.947 g/ml, compared with 0.96 for pure polyethylene.

EXAMPLE 6

50 ml of toluene were initially taken in the glass autoclave described and pretreated in Examples 1 to 5 and the system was subjected to thermostatic control at the experimental temperature of +20° C. 130 mg (2.2 mmoles of aluminum units) of methylaluminoxane, prepared in accordance with Example 1, were then added. After stirring for a short time (3 minutes), a solution in toluene of $(C_5H_5)_2ZrCl_2$ ($6.66 \times 10^{-7}$ mole) was added and 50 ml of 1-hexene were then pipetted in. After stirring for a time of 150 hours, the polymerization was discontinued by adding a little methanol. The reaction mixture was worked up analogously to the method described in Example 4. The yield was 8.4 g of atactic, glass-clear polyhexene.

EXAMPLE 7

In order to produce an ethylene/hexene copolymer, 190 ml of toluene and 10 ml of 1-hexene were initially taken, analogously to Examples 1 to 6, and the system was subjected to thermostatic control at the experimental temperature of 60° C. 200 mg (3.4 mmoles of aluminum units) of methylaluminoxane, prepared in accordance with Example 1, were then added. After stirring for a short time, approximately 5 minutes, 0.5 ml of an $8.0 \times 10^{-4}$ molar solution in toluene of $(C_5H_5)_2ZrCl_2$ was pipetted in and ethylene was then injected up to a pressure of 8.5 bar. After a polymerization time of 25 minutes, it was necessary to destroy the catalyst by adding ethanol, since the autoclave was full of polymer. The activity, at a yield of 9.2 g, was $4 \times 10^5$ g of polymer/g of Zr.hour.bar. The density was 0.941 g/cm³.

EXAMPLE 8

(comparison example)

The preliminary arrangements were carried out as in Example 1. $0.5 \times 10^{-3}$ mole of aluminum trimethyl were added to 250 ml of toluene, subjected to thermostatic control at 20° C., and $0.4 \times 10^{-3}$ mole of water were added dropwise, while stirring, in the course of 25 minutes. After a subsequent reaction time of a further 5 minutes, $0.5 \times 10^{-7}$ mole of $(C_5H_5)_2TiCl_2$ was added to the solution, ethylene was injected to a pressure of 8 bar and polymerization was carried out for one hour. The polymer was then filtered off, washed several times with methanol and dried. The average degree of oligomerization of the aluminoxane was 3 to 5. The yield was 4.9 g. This corresponds to an activity of 28,000 g of polyethylene/g of Ti.hour.bar.

EXAMPLE 9

(comparison example)

The procedure followed was as in Example 8, but $(C_5H_5)_2TiCl(CH_3)$ was employed instead of the dichloride. The yield after a reaction time of 1 hour was 2.6 g. This corresponds to an activity of 15,000 g of polyethylene/g of Ti.hour.bar.

EXAMPLE 10

(comparison example)

The procedure followed was analogous to that of Example 8. The quantity of toluene was altered to 330 ml, the reaction temperature was altered to 70° C. and the transition metal compound employed was 0.33 mole of $(C_5H_5)_2ZrCl_2$. The activity of the catalyst was found to be 390,000 g of polyethylene/g of Zr.hour.bar.

We claim:

1. A process for the preparation of a polyolefin by polymerizing an olefin of the formula CH₂CHR in which R=H or $C_1$-$C_{10}$ alkyl, on its own or as a mixture, with other olefins or with $C_4$-$C_{12}$ α,ω-diolefins, in solvents, liquid monomers or the gas phase, at temperatures between −50° and 200° C., using a soluble, halogen-containing transition metal compound and aluminoxanes, which comprises carrying out the polymerization in the presence of a catalyst system composed of the following components:
   (a) bis-(cyclopentadienyl)-zirconium dichloride or bis-(cyclopentadienyl-zirconium monomethyl monochloride, and
   (b) a compound, containing aluminum, of the aluminoxane type having the general formulae

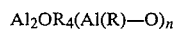

for a linear aluminoxane and

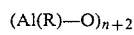

for a cyclic aluminoxane, in which n is a number from 4 to 20 and R is a methyl or ethyl radical.

2. The process as claimed in claim 1, wherein (b) is methylaluminoxane.

3. The process as claimed in claim 1, wherein the polymerization of ethylene is carried out at transition metal concentrations from $10^{-6}$ to $10^{-8}$ mole/l.

4. The process as claimed in claim 1, wherein the polymerization is carried out with impure ethylene without increasing the catalyst concentration.

5. The process as claimed in claim 1, wherein the polymerization temperature is between 20° and 120° C.

6. The process as claimed in claim 1, wherein ethylene is copolymerized with propylene.

7. The process as claimed in claim 1, wherein the copolymerization of ethylene with other α-olefins is carried out.

8. A process for the preparation of a polyolefin by polymerizing at least one olefin of the formula CH₂=CHR¹ in which R¹=H or $C_1$ to $C_5$ alkyl, in solvents, liquid monomers or the gas phase, at temperatures between −50° and 200° C., which comprises carrying out the polymerization in the presence of a catalyst system comprising:

(a) bis-(cyclopentadienyl)-zirconium dichloride or bis-(cyclopentadienyl)-zirconium monomethyl monochloride and
(b) a compound of the aluminoxane type having the general formula $$Al_2O(CH_3)_4(Al[CH_3]-O)_n$$

for a linear aluminoxane and $$(Al[CH_3]-O)_{n+2}$$

for a cyclic aluminoxane, in which n is a number from 4 to 20;
wherein the aluminoxane concentration is $10^{-8}$ to $10^{-1}$ mole/l and the Zr concentration is $10^{-6}$ to $10^{-8}$ mole/l.

* * * * *